(12) United States Patent
Kassulat

(10) Patent No.: US 6,259,033 B1
(45) Date of Patent: Jul. 10, 2001

(54) HOLDING DEVICE FOR SEALED INSERTION OF CABLES THROUGH ENCLOSURE WALLS

(75) Inventor: Bernd Kassulat, Kernen (DE)

(73) Assignee: Friedrich Lutze Elektro GmbH (DE)

( * ) Notice: Subject to any disclaimer, the term of this patent is extended or adjusted under 35 U.S.C. 154(b) by 0 days.

(21) Appl. No.: 09/465,610

(22) Filed: Dec. 17, 1999

(30) Foreign Application Priority Data

Jan. 19, 1999 (DE) .............................. 199 01 914

(51) Int. Cl.$^7$ .................................. H01B 17/26
(52) U.S. Cl. ................. 174/151; 174/65 R; 174/65 G
(58) Field of Search .................. 174/65 R, 65 G, 174/135, 151, 152 G, 153 G; 248/56; 16/2.1, 2.2; 220/3.92, 3.94, 4.02

(56) References Cited

U.S. PATENT DOCUMENTS

| | | | |
|---|---|---|---|
| 4,605,816 | * | 8/1986 | Jorgensen et al. ............. 174/65 R |
| 4,970,350 | * | 11/1990 | Harrington ..................... 174/65 G |
| 6,177,633 | * | 6/1999 | Gretz ............................. 174/65 G |

* cited by examiner

Primary Examiner—Dean A. Reichard
Assistant Examiner—Hung Nguyen
(74) Attorney, Agent, or Firm—Adams, Schwartz & Evans, P.A.

(57) ABSTRACT

A holding device for sealed insertion of cables (18) through enclosure walls, having a holding plate with several cable lead-through openings (13), which can be mounted on the enclosure wall also having cable lead-through openings, and an elastic sealing plate (11), which in the mounted state is located between the holding plate (10) and the enclosure wall. The sealing plate (11) has pre-manufactured cable perforation points (14) in true alignment with the cable lead-through openings (13). Furthermore, the holding plate has flexible holding tabs (15) extending sideways into the cable lead-through openings (13), and each of the tabs is deflected toward the enclosure wall if a cable (18) is inserted into the appropriate cable opening (13) and, if tensile strain is placed upon the cable (18), digs into the cable in the opposite direction, whereby the deflection toward the wall remains. With this holding device, cables (18) with different cross-sections can be held in the same cable openings (13), and simple unfastening for pulling out the cable is also possible.

14 Claims, 2 Drawing Sheets

HOLDING DEVICE FOR SEALED INSERTION OF CABLES THROUGH ENCLOSURE WALLS

TECHNICAL FIELD AND BACKGROUND OF THE INVENTION

This invention relates to a holding device for sealed cable insertion through enclosure walls, having a holding plate with several cable lead-through openings, which can be mounted on the enclosure wall also having cable lead-through openings, and an elastic sealing plate, which in the mounted state is located between the holding plate and the enclosure wall, having pre-manufactured cable perforation points in true alignment with the cable lead-through openings.

In such a holding device, which is known for example from CH 688 012, a flexible plate is placed between a retainer plate and a counter plate, whereby these three plates are secured on a housing wall by means of a flange. After sealed insertion of the cable, it is pulled back slightly, so that the area of the flexible plate surrounding the cable is pulled into the retainer plate lead-through opening having a smaller diameter, where it gets jammed. This provides the desired cable strain relief and at the same time sealing off of the cable lead-through.

The disadvantage of the known holding device is, on the one hand, that the strain relief is only effective for a very specific cable cross-section, so that cables with different cross-sections necessitate a very complicated arrangement including an exact adjustment of the openings with the respective cable cross-sections. Once such a holding device is installed only the originally intended cables can be used. A further disadvantage is that after the cable gets jammed, it cannot be pulled out backwards; for example, if the wrong cable was inserted accidentally. Finally, the known holding device is complicated and awkward to manufacture and mount, due to the high number of required plates, which also has cost disadvantages.

SUMMARY OF THE INVENTION

Therefore, it is an object of the invention to provide a simpler holding device of the aforementioned type, where in each opening cables with different cross-sections can be used and secured with a tight seal.

In the invention, the means for achieving the object of the invention is the holding plate having flexible holding tabs extending sideways into the cable lead-through openings, where each of the tabs is deflected toward the enclosure wall if a cable is led through the appropriate cable opening and, if tensile strain is placed upon the cable, digs into the cable in the opposite direction, whereby the deflection toward the wall remains.

The flexible holding tabs ensure good strain relief, and the deflection to the enclosure wall is different for different cable cross-sections; however, their digging into the cable upon tensile strain is guaranteed in any event. Since the deflection toward the wall remains, basically the holding tabs form slanted support posts that counter the strain relief. A further advantage of the flexible holding tabs is that they can be unfastened in a simple manner, so that the respective cable can be pulled back and out of the respective cable opening easily. Since unfastening can be done from the front side, it is not necessary to dismount the holding device. Due to the holding tabs of the invention, cables with different cross sectional shapes can be secured effectively. Due to the separation of sealing and strain relief, no forces act upon the sealing plate, so that good sealing is given even under tensile strain. Manufacture and installation can be done fast and cost-efficiently, since the holding device consists basically of two components only, namely the holding plate and the sealing plate. The holding plate can have any shape or thickness.

Especially good strain relief and especially secure holding of the cable is ensured in that the free ends of the holding tabs are shaped like blades or are at least pointed. In a particularly simple, cost efficient embodiment of the holding plates the holding tabs are integrally connected with the plate and are formed by two slits in the holding plate. In order to achieve the required springy elasticity, the holding tabs should be thinner than the basically rigid holding plate. Preferably, the holding tabs are attached to the holding plate on that side of the holding plate that points away from the sealing plate, so that the deflection into the respective cable lead-through openings is possible without impairment of the sealing plate.

The cable penetration points are advantageously shaped like blind holes to enable good lead-in of the respective cable and a relatively easy break-through of the bottom area. This bottom area then snuggly closes around the cable.

In an especially simple constructive embodiment, each opening is assigned one holding tab. This offers the advantageous opportunity of arranging several holding tabs parallel next to each other, with the free ends alternately pointing in opposite directions and ending in cable openings that are arranged in two parallel rows. This ensures an especially compact arrangement of the cable openings. For attachment purposes the holding plate and the sealing plate have preferably aligned mount holes, so that the holding plate can be secured to the enclosure wall by means of screws, thereby tightly squeezing the sealing plate between them.

A particularly cost-efficient solution is to make the flexible sealing plate part of a flexible tape that may be cut into sections, so that holding plates of any length can be easily equipped with a suitable sealing plate by cutting this tape.

In order to connect several holding plates in a simple manner in an exact configuration, each holding plate has on its opposed boundary lines notched elements for intermeshed placement of plates next to each other. Here, it is preferable that the opposed boundary lines be designed in such a manner that the holding plates placed next to each other yield a constant spacing of the cable openings in the longitudinal direction. This enables the use of cut partial pieces of a flexible tape as sealing plates.

The holding plate can have cable openings with different diameters and/or different shapes, to hold very different cables. A particularly good sealing effect can be achieved by using neoprene as the sealing plate material. For easy loosening or unfastening of the holding tabs, a pen-like tool is preferable, with which the pertinent holding tab is simply pushed inward.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
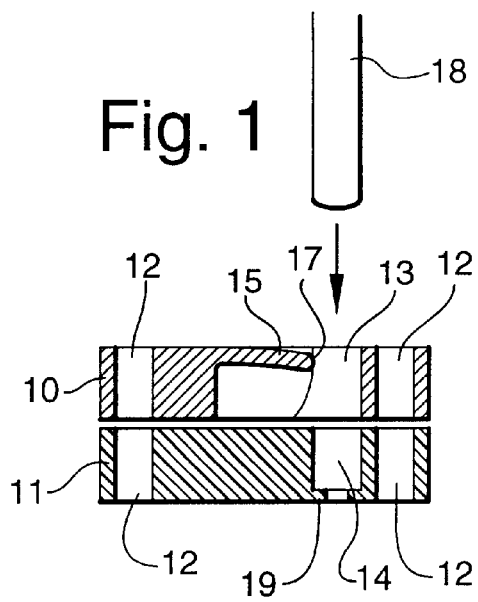
FIG. 1 is a sectional view of a holding device comprising a holding plate and a sealing plate prior to insertion of a cable.

Referring now specifically to the drawings, a holding device as shown in FIG. 1 to 4 as the first exemplary embodiment comprises a basically rigid holding plate 10 made of metal or plastic and a sealing plate 11 made of an elastic, flexible material, for example neoprene, and having basically the same outer contours. In the four corner areas the basically rectangular plates 10, 11 have mounting holes 12, so that he holding plate 10 can be screwed 20 to an enclosure wall, which is not shown, by means of screws, which are not shown, so that the sealing plate 11 is located between them, forming a seal. This enclosure wall can be the wall of a control panel enclosure, a housing, a connection socket, or similar, and the holding device can be used any place where sealed insertion of a cable through a wall with simultaneous strain relief is required.

The holding plate 10 has eight cable openings 13, which are arranged in two rows and which are in true alignment with blind holes 14 in the sealing plate 11. Eight holding tabs 15 are integrally connected with holding plate 10 so that their free ends slightly extend into the cable openings 13. These holding tabs 15 are arranged parallel to each other, with their free ends alternately pointing in opposite directions, thereby alternately extending into a cable opening 13 of one and the other row. The holding tabs 15 are formed by the to appropriate parallel slits 16 in the holding plate 10. From FIG. 1 it is apparent that the holding tabs 15 are significantly thinner than the holding plate 10, in order to achieve the necessary elasticity and flexibility of the holding tabs 15. The one-piece connection of the holding tabs 15 with the holding plate 10 is achieved on the side pointing away from the sealing plate 11, so that the deflection of the holding tabs 15 toward the sealing plate 11 is possible without impairing it.

The free ends of the holding tabs 15 are shaped in a blade-like manner 17, to ensure that they dig in well into a cable 18. The blades 17 are shaped like partial circles and thereby adapted to the outer circumference of a round cable 18. Instead of the blade-like free ends, they may also have one or several points.

Figure 3:
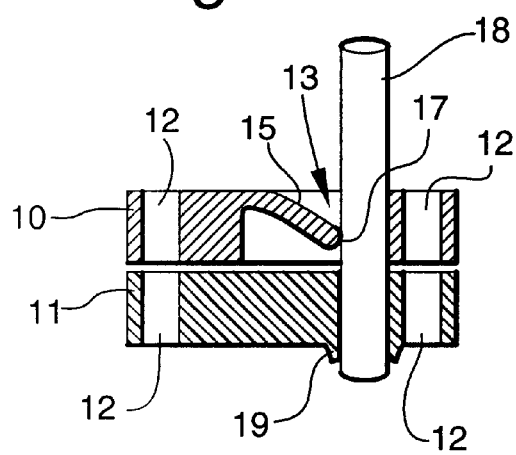
FIG. 3 is a cross-sectional view corresponding to FIG. 1 with the inserted cable.
Figure 2:
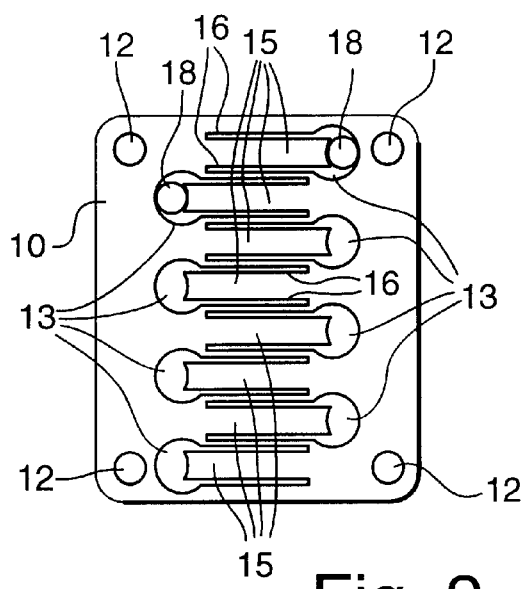
FIG. 2 is a top view of holding plate shown in FIG. 1.
Figure 4:
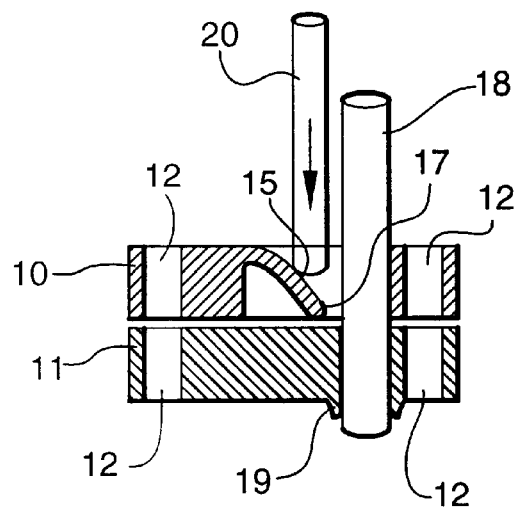
FIG. 4 is a corresponding cross-sectional view with an unfastened holding tab.

For installation purposes the cable 18 is inserted into a cable opening 13, thereby deflecting the holding tabs 15 extending into this cable opening 13 toward the sealing plate 11. The cable 18 then breaks through the thin bottom area 19 of the blind hole 14, where the bottom area 19 then tightly wraps around the cable 18, as it is depicted in FIG. 3 and 4. FIG. 3 shows the cable 18 in the inserted or pushed-in state. In the event of outward tensile stress upon the cable 18, the holding tab 15 or its blade-like free end digs into the cable 18 like a hook, so that very good strain relief is achieved. The holding tabs 15 thus act as inclined supports during tensile stress.

If the cable 18 needs to be pulled out again, the tab 15 is pushed inward with a pen-like tool 20, as depicted in FIG. 4, so that it is unfastened and the cable 18 can be pulled out effortlessly. Due to the thin bottom areas 19, which close off the blind holes 14, unused cable openings 13 are automatically sealed off. When inserting round cables 18 with different cross-sections, the holding tabs 15 are deflected more or less toward the sealing plate 11, so that cables with cross-sections between approximately 5 and 8 mm can be securely fixed, as depicted in the exemplary embodiment. If cables with cross-sections outside this range need to be secured, a holding plate 10 may have cable openings 13 with different diameters. Number, arrangement, and shape of the cable openings 13 are basically variable. For example, embodiments for flat cables can be realized, while several holding tabs 15 per cable openings 13 may be devised, depending on the requirements.

The thickness of holding plate 10 and sealing plate 11 can also vary within a broad range. For example, a significantly thinner sealing plate 11 can be used than in the first exemplary embodiment.

Figure 5:
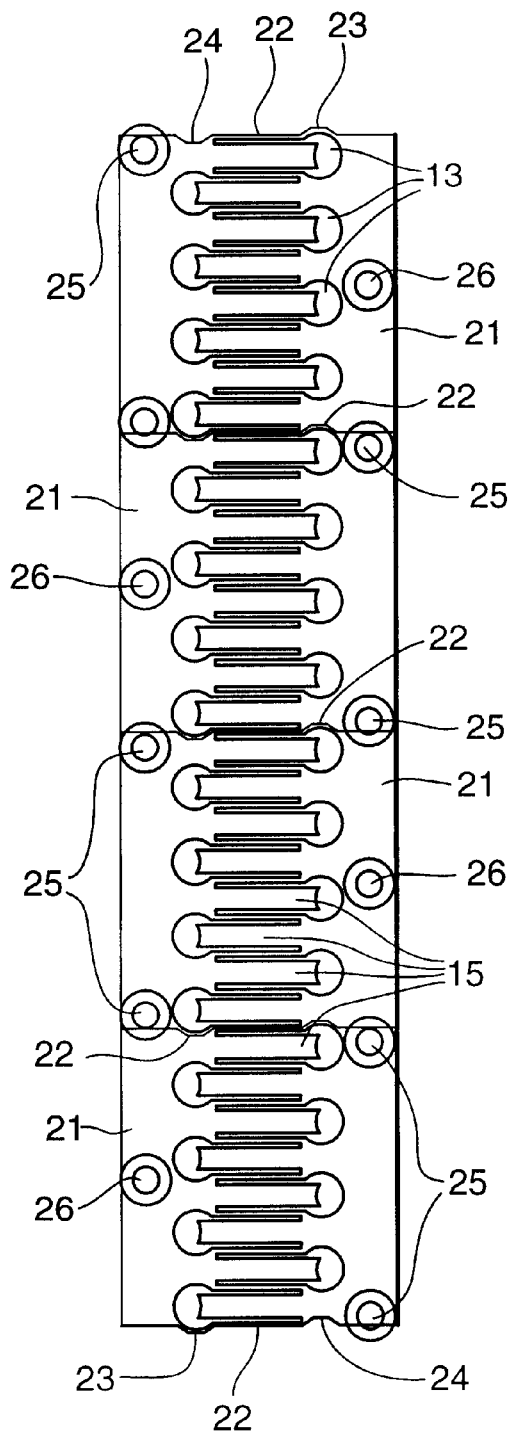
FIG. 5 shows Four intermeshed holding plates placed next to each other, in a top view as a further embodiment of the invention.
Figure 6:
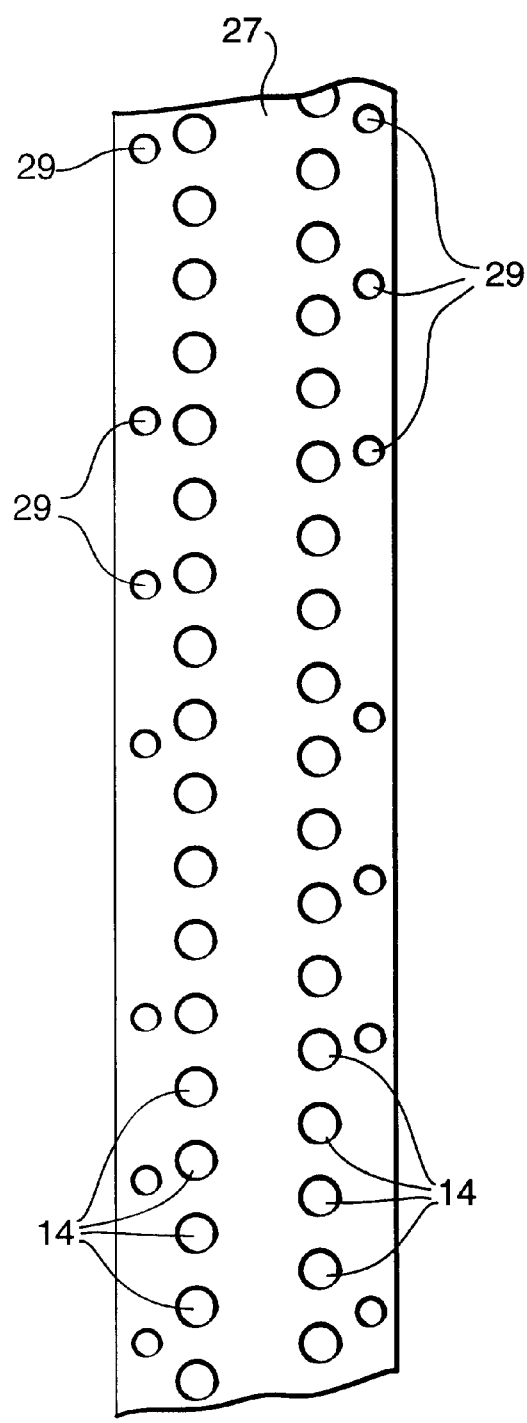
FIG. 6 illustrates a flexible tape, from which flexible sealing plates of suitable length can be cut.

The second exemplary embodiment depicted in FIG. 5 and 6 corresponds largely to the first exemplary embodiment, and identical components and areas or components and areas with the same function have the same reference symbols and are not specified again.

According to FIG. 5, four holding plates 21, which basically correspond to holding plate 10, are placed next to each other. Contrary to the first exemplary embodiment, the boundary lines 22 of the holding plates 21 running crosswise to the row arrangement of the cable openings 13, have protrusions 23 and cutouts 24, so that intermeshing results when the plates are placed next to each other. In addition, the boundary lines 22 are arranged in such a manner that a constant hole spacing between the cable openings 13 results. In part, the mounting holes 25 are arranged in the area of the abutting boundary lines 22, so that the non-depicted pertinent holding screws grab, overlap, and secure the two abutting holding plates 21. Additionally, the middle areas have mount holes 26.

FIG. 6 shows an elastic, flexible tape 27 having two rows of blind holes 28, where the spacing among themselves and the spacing within the flexible tape 27 corresponds to the spacing of the cable openings 13 of the holding plates 21 placed next to each other. Furthermore, mounting holes 29 are intended, which also correspond to the mounting holes 25, 26 of the holding plates 21 placed next to each other. By cutting this flexible tape 27, the sealing plates can be made to match the lengthwise arrangement of the holding plates 21, and suitable sealing plates for individual holding plates 21 can be cut from this flexible tape 27. Also, the sealing plate 11 of the first exemplary embodiment can be created by cutting the respective flexible tape accordingly. Also, in the second exemplary embodiment, corresponding variations in the shape, arrangement and number of cable openings 13 are possible.

A holding device for sealed insertion of cables through enclosure walls is described above. Various details of the invention may be changed without departing from its scope. Furthermore the foregoing description of the preferred embodiment of the invention and the best mode for practicing the invention are provided for the purpose of illustration only and not for the purpose of limitation—the invention being defined by the claims.

I claim:

1. Holding device for sealed insertion of cables through enclosure walls, having a holding plate with a plurality of cable lead-through openings, which can be mounted on the enclosure wall also having cable lead-through openings, and an elastic sealing plate, which in the mounted state is located between the holding plate and the enclosure wall, having pre-manufactured cable perforation points in true alignment with the cable lead-through openings, characterized in that the holding plate (10; 21) has flexible holding tabs (15) extending sideways into the cable lead-through openings (13), each of the tabs being deflected toward the enclosure wall if a cable (18) is inserted into the appropriate cable opening (13) and, if tensile strain is placed upon the cable (18), digging into the cable in the opposite direction, whereby the deflection toward the wall remains.

2. Holding device pursuant to claim 1, characterized in that the free ends of the tabs (15) are shaped in a blade-like manner or are at least pointed.

3. Holding device pursuant to claim 1 or 2, characterized in that the tabs (15) are attached to the holding plate (10; 21) in one piece and especially in that they are formed by slits each (16) in the holding plate.

4. Holding device pursuant to one claim 1, characterized in that the tabs (15) are thinner than the basically rigid holding plate (10; 21) for the purpose of achieving a springy elasticity.

5. Holding device pursuant to claim 4, characterized in that the tabs (15) are attached to the holding plate (10; 21) on that side of the holding plate that points away from the sealing plate (11).

6. Holding device pursuant to claim 1, characterized in that the cable perforation points (14) are shaped like blind holes.

7. Holding device pursuant to claim 1, characterized in that each cable opening (13) is assigned one tab (15).

8. Holding device pursuant to claim 7, characterized in that a plurality of tabs (15) are arranged parallel to each other, with the free ends alternately pointing in opposite directions and ending in cable openings (13) that are arranged in two parallel rows.

9. Holding device pursuant to one claim 1, characterized in that the holding plate (10) and the sealing plate (11) have mounting holes (12; 25, 26, 29) that are in alignment with each other.

10. Holding device pursuant to claim 1, characterized in that the flexible sealing plate (11) is embodied as part of a flexible tape (27) that is cut into sections.

11. Holding device pursuant to claim 1, characterized in that the holding plate (21) has on its opposed boundary lines (22) notching elements (23, 24) for intermeshed placing of several holding plates (21) next to each other.

12. Holding device pursuant to claim 11, characterized in that the opposed boundary lines (22) are designed in such a manner that the spacing between the cable openings (13) is constant in the longitudinal direction, if holding plates (21) are placed next to each other.

13. Holding device pursuant to one claim 1 characterized in that the holding plate has cable openings with different cross-sections and/or shapes.

14. Holding device pursuant to claim 1, characterized in that the sealing plate (11) is made of neoprene.

* * * * *

UNITED STATES PATENT AND TRADEMARK OFFICE
CERTIFICATE OF CORRECTION

| | | |
|---|---|---|
| PATENT NO. | : 6,259,033 B1 | Page 1 of 1 |
| APPLICATION NO. | : 09/465610 | |
| DATED | : July 10, 2001 | |
| INVENTOR(S) | : Bernd Kassulat | |

It is certified that error appears in the above-identified patent and that said Letters Patent is hereby corrected as shown below:

In column 5, line 17, delete "formed by slits" and insert therefor -- formed by 2 slits --.

Signed and Sealed this

First Day of July, 2008

JON W. DUDAS
*Director of the United States Patent and Trademark Office*